United States Patent [19]
Hileman, Jr.

[11] Patent Number: 5,673,577
[45] Date of Patent: Oct. 7, 1997

[54] AUTOMOBILE ANTI-THEFT DEVICE

[76] Inventor: Robert A. Hileman, Jr., 1285 Old York Rd., Warminster, Pa. 18974

[21] Appl. No.: 476,700

[22] Filed: Jun. 7, 1995

[51] Int. Cl.⁶ .................................................. B60R 25/02
[52] U.S. Cl. ............................... 70/209; 70/226; 70/238
[58] Field of Search ......................... 70/207, 209–212, 70/224–226, 237–238

[56] References Cited

U.S. PATENT DOCUMENTS

| | | | |
|---|---|---|---|
| 4,103,524 | 8/1978 | Mitchell et al. | 70/209 |
| 4,175,410 | 11/1979 | Schwaiger | 70/226 |
| 4,304,110 | 12/1981 | Fain | 70/209 |
| 4,738,127 | 4/1988 | Johnson | 70/209 |
| 5,014,529 | 5/1991 | Wu | 70/209 |
| 5,052,201 | 10/1991 | Liou | 70/209 |
| 5,131,245 | 7/1992 | Chen | 70/209 |
| 5,138,853 | 8/1992 | Chen | 70/209 |
| 5,144,822 | 9/1992 | Jan et al. | 70/209 |
| 5,174,138 | 12/1992 | Shen | 70/209 |
| 5,197,308 | 3/1993 | Pazik | 70/209 |
| 5,199,284 | 4/1993 | Lin | 70/209 |
| 5,239,849 | 8/1993 | Gallardo | 70/209 |
| 5,327,753 | 7/1994 | White | 70/209 |
| 5,359,869 | 11/1994 | Chen | 70/209 |
| 5,375,441 | 12/1994 | Liou | 70/209 |
| 5,381,679 | 1/1995 | Cummins | 70/209 |

Primary Examiner—Steven N. Meyers
Assistant Examiner—Gary Estremsky
Attorney, Agent, or Firm—Volpe and Koenig, P.C.

[57] ABSTRACT

A tamper-resistant anti-theft device inhibits rotation of a vehicle steering wheel thus preventing theft of the vehicle and discouraging theft of the driver's side air bag.

14 Claims, 7 Drawing Sheets

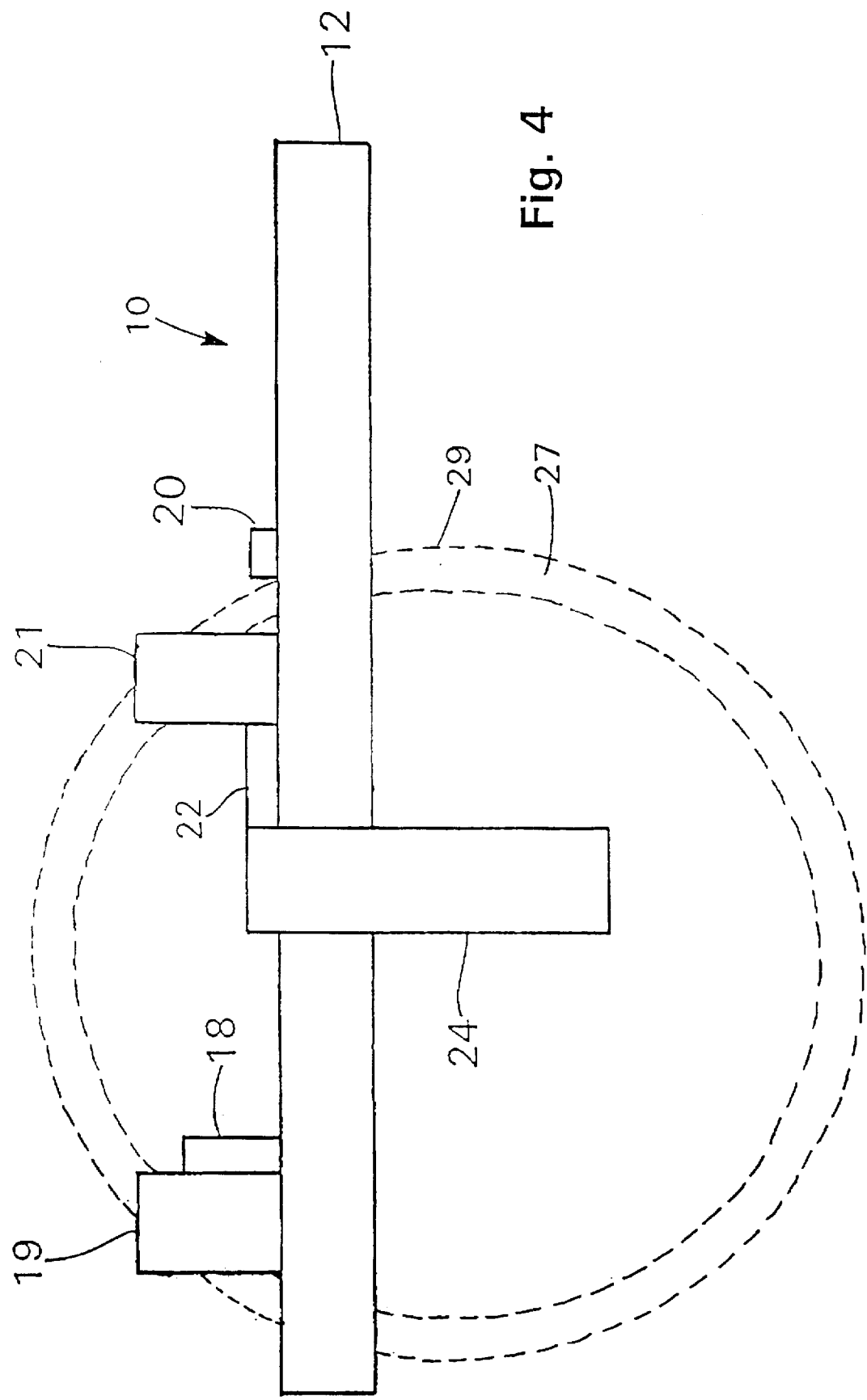

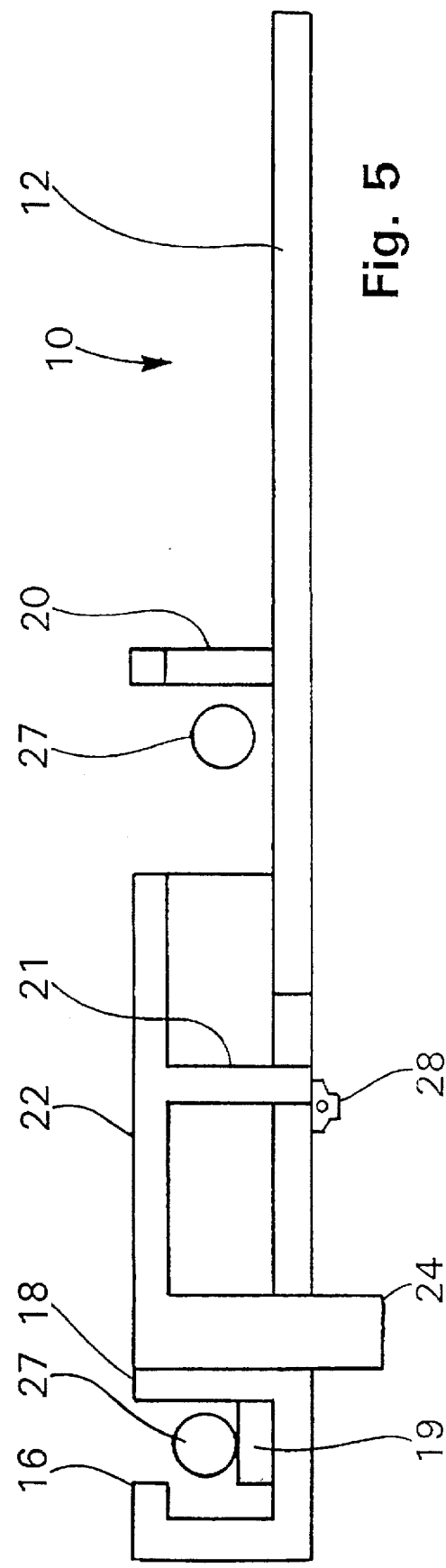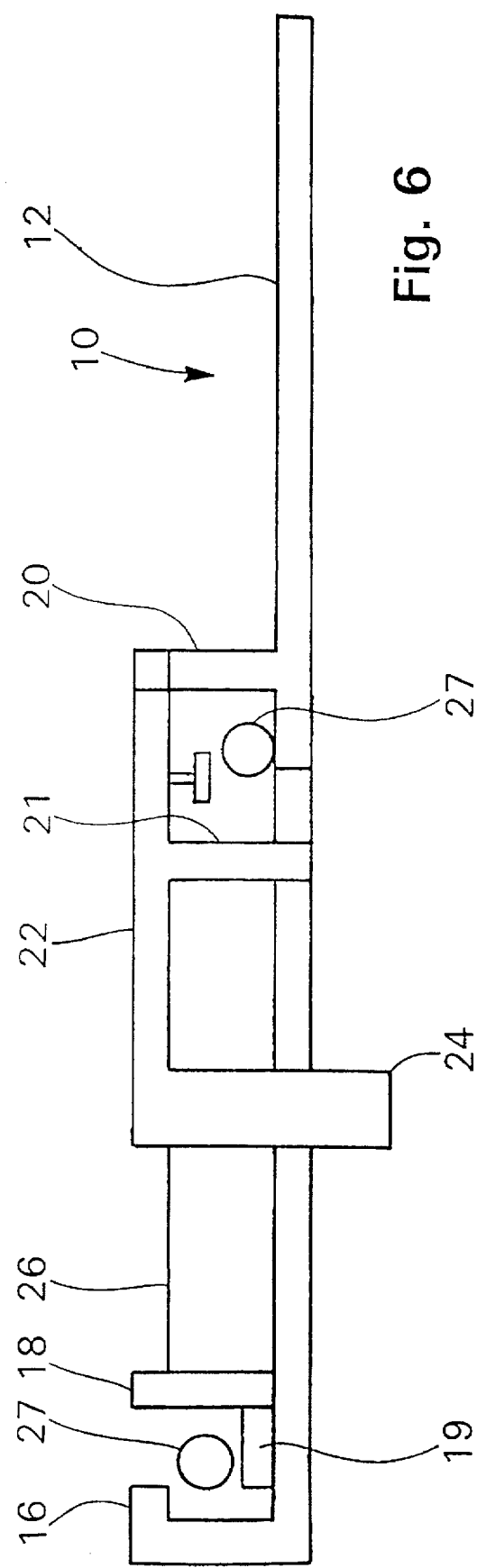

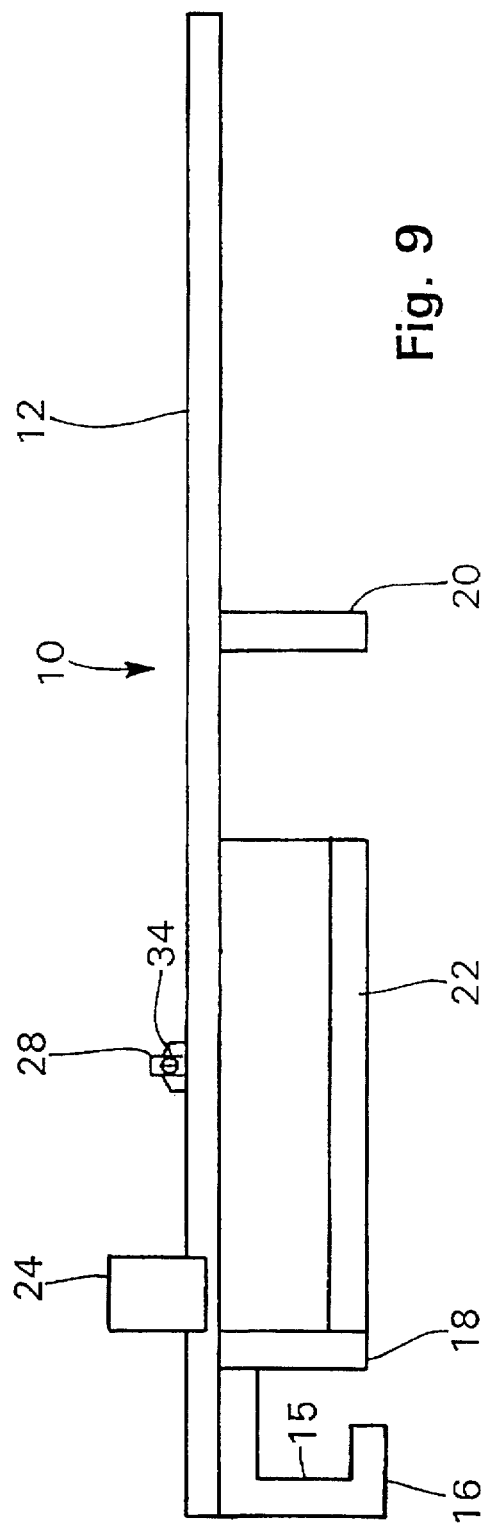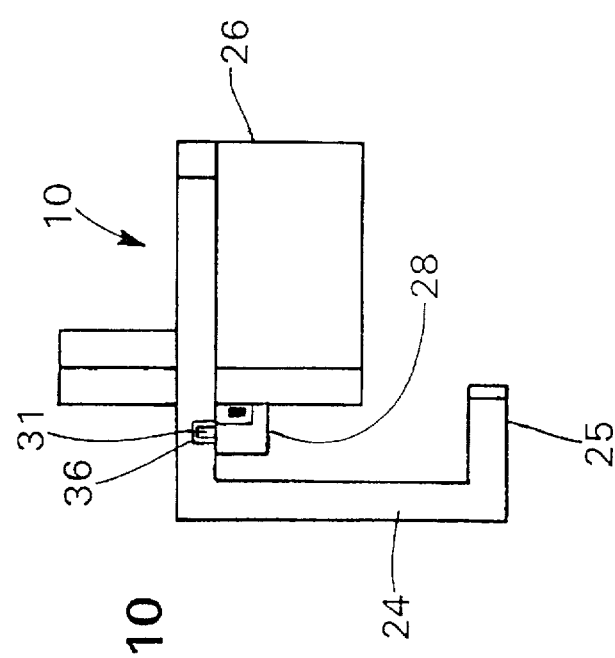

AUTOMOBILE ANTI-THEFT DEVICE

BACKGROUND OF THE INVENTION

1. Field of the Invention

This invention generally relates to vehicle anti-theft devices. More particularly, the invention relates to devices of the type which are attached to a vehicle steering wheel to prevent or limit rotation and removal thereof.

2. Description of Related Art

A number of different vehicle anti-theft devices of the type which are attachable to a steering wheel are presently known. In one common form, the device includes two hooked portions that engage diametrically opposite portions of the steering wheel. Normally such devices can be extended to accommodate a variety of steering wheel widths and placements. These devices also include a member which extends beyond the steering wheel periphery to engage a portion of the vehicle interior so that steering wheel rotation is limited. Examples of such devices are shown in U.S. Pat. Nos. 4,103,524 (Mitchell), 4,738,127 (Johnson), 5,144,822 (Jan). Such devices include a section which extends outwardly beyond the periphery of the steering wheel a predetermined distance, wherein rotation of the wheel is limited by engagement of such section, the interior surface of the vehicle or the operator.

U.S. Pat. No. 4,103,524 further discloses a device wherein the space in between the hooks is fixed. U.S. Pat. No. 4,738,127 discloses an anti-theft device which is telescopic to adjust for varying steering wheel widths. U.S. Pat. No. 5,144,822 further discloses a telescopic anti-theft device with a reinforced locking mechanism.

The devices that are presently known are often relatively complex and their locking mechanisms do not provide the desired degree of security due to the open exposure of the locking mechanism itself. In addition, most existing devices are telescopic and variable in length, which makes them easily subverted by the cutting of the rim of the steering wheel. Most of the known devices also do not provide additional protection of the center area steering wheel to prevent removal of the vehicle's supplemental restraint system.

SUMMARY OF THE INVENTION

A preferred embodiment of the invention comprises a tamper resistant automobile anti-theft device for attachment to steering wheels of a selected size. The device includes an elongated bar, having a length greater than the steering wheel diameter, with a hook and a first spacer for enclosing a first portion of the steering wheel, a second spacer extending for engaging a diametrically opposed second portion of the steering wheel, a closing latch slidably mounted on the bar for defining an enclosure to confine the second portion of the steering wheel between the closing latch and the second spacer, a lock covering handle integral with the closing latch which projects a distance away from a front surface of the bar, and a lock fixedly attached to the bar secures the closing latch.

The present invention provides a tamper resistant vehicle security device for reducing the risk of vehicle theft.

The present invention provides a locking device wherein the locking mechanism is protected from tampering.

The present invention provides a vehicle anti-theft device which inhibits steering wheel and supplemental restraint system removal.

BRIEF DESCRIPTION OF DRAWINGS

FIG. 4 is a front elevation of the preferred embodiment in a closed position;

FIG. 5 is a bottom plan view of the preferred embodiment in an opened position;

FIG. 6 is a top plan view of the preferred embodiment in a locked position;

FIG. 9 is a view along the line 9—9 in FIG. 3; and

FIG. 10 is a view along the line 10—10 in FIG. 3.

DETAILED DESCRIPTION OF THE PREFERRED EMBODIMENT

Figure 1:
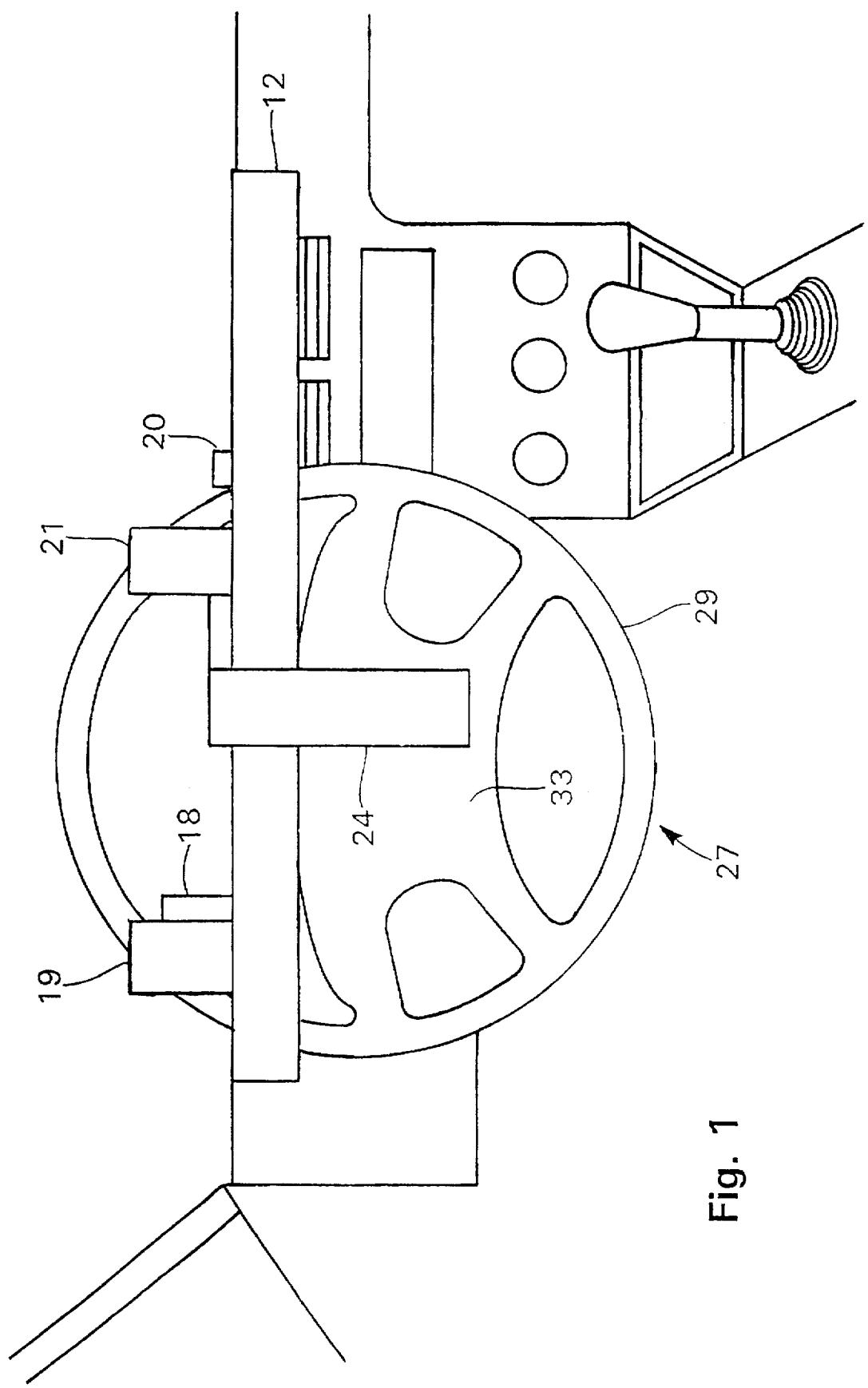
FIG. 1 is a schematic view showing the anti-theft device on a steering wheel.
Figure 2:
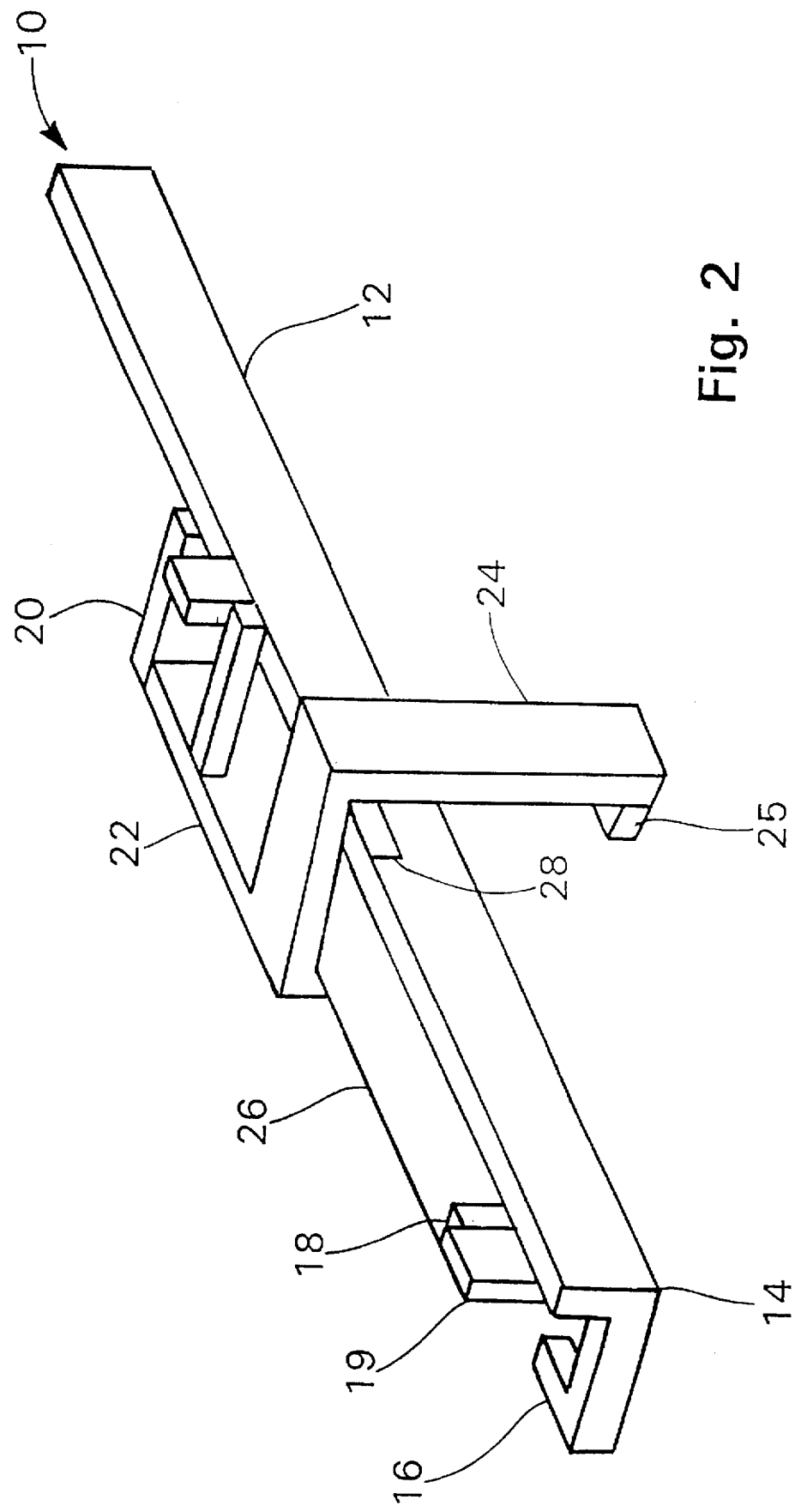
FIG. 2 is an isometric view of a preferred embodiment of the present invention in a locked position.

Referring to FIGS. 1 and 2, there is illustrated a tamper resistant anti-theft device, according to the present invention. The device 10 includes an elongated bar 12 which is preferably solid and of rectangular cross section. At a first end of the bar 12 is an L-shaped hook 16 and a substantially rectangular first spacer 18 for engagement with a first portion of the rim of a steering wheel. Located about the member 12 is a lock covering handle 24 with closing latch 22 which overhangs from a front surface of bar 12. The latch 22 and handle 24 are slidably mounted along guide box 26. The handle 24 is moved longitudinally along the bar 12 for abutment with a second, substantially rectangular, spacer 20, which defines an enclosure for confining the steering wheel rim 29. The latch 22 and the second spacer 20 confine a diametrically opposed portion as confined by the hook 16 and the first spacer 18. When the device is in the locked position, handle 24 extends over the steering wheel hub 33.

As shown in FIG. 2, a first engagement area is defined by the hook 16 and the first spacer 18. The hook 16 abuts an outside portion of the steering wheel 27, not shown, while the spacer 18 abuts an inside portion of the steering wheel rim 29, not shown.

A second engagement area is defined by the second spacer 20 and the latch 22. The second spacer 20 abuts a second outside portion of the steering wheel rim 29, not shown, and is prohibited from movement by the closing of latch 22.

Figure 3:
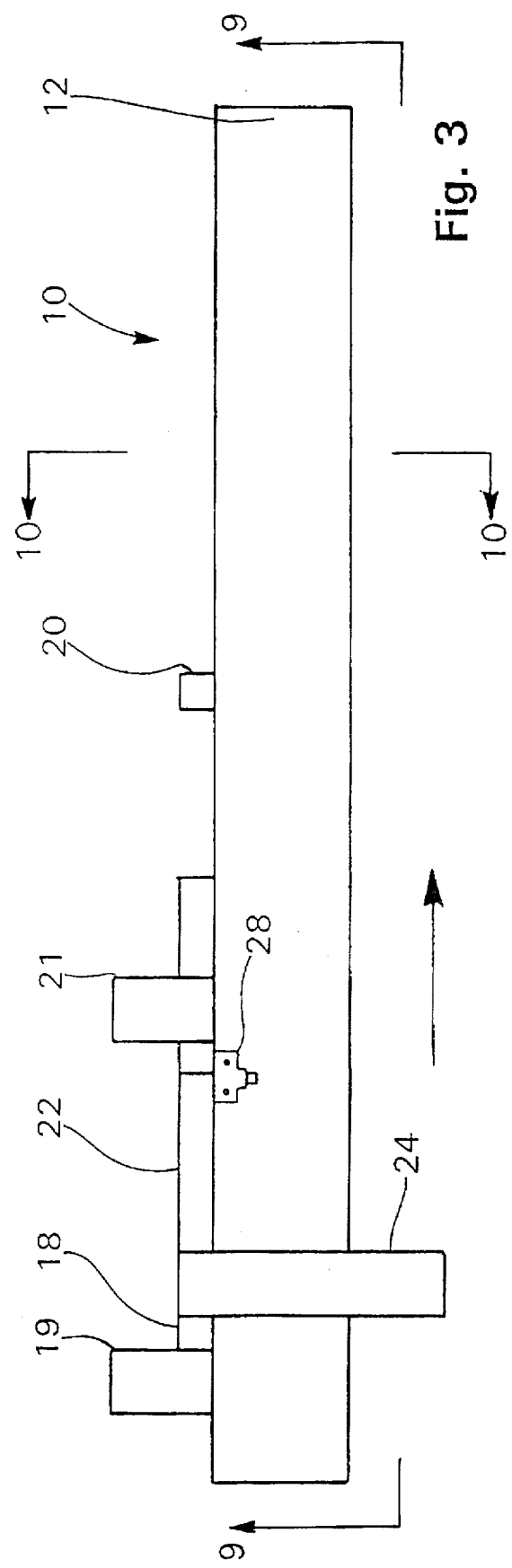
FIG. 3 is a front elevation of the preferred embodiment in an opened position.

Operation of the device is further shown in FIGS. 3 and 4. The device 10 is located relative to the steering wheel 27 so as to extend generally diametrically or chordally thereof. The hook 16, not shown, and the first spacer 18 are located about the steering wheel rim 29 at one position. The handle 24 is slid along the bar 12 until the latch 22 abuts with the second spacer 20 on the steering wheel rim 29. The relative position of the steering wheel 27 is shown in FIGS. 5 and 6. As the latch 22 is slid along the bar 12, the steering wheel is secured within the space defined by a crossbar 21 and the spacer 20.

With reference to FIGS. 5 and 6, the anti-theft device 10 is further reinforced by a block 19 positioned between hook and spacer 18 and a crossbar 21 which is fixedly attached to latch 22. The block 19 reinforces the steering wheel engagement area defined by the hook 16 and the spacer 18 so as to further limit any movement of the steering wheel rim within the hook 16 and spacer 18. Block 19 further prevents cutting of a portion of the steering wheel located immediately above the hook 16 and first spacer 18. Thus the device 10 cannot be slid upward and off the steering wheel 27. This block also aids in preventing the steering wheel from being cut right along hook 16. As shown in FIG. 5, upon closing the latch 22, the crossbar 21 further inhibits movement of the portion of the steering wheel which is confined between the spacer 20 and the latch 22 and thus prevents any shimmying back and forth of the device 10. The crossbar 21 abuts a second inside portion of steering wheel rim 29. The crossbar further prevents the cutting of a portion of the steering wheel immediately above the second inside portion of the steering wheel rim 29.

Figure 8:
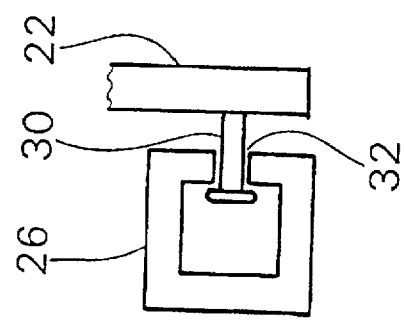
FIG. 8 is a diagrammatic section of the guide pin and sliding box.
Figure 7:
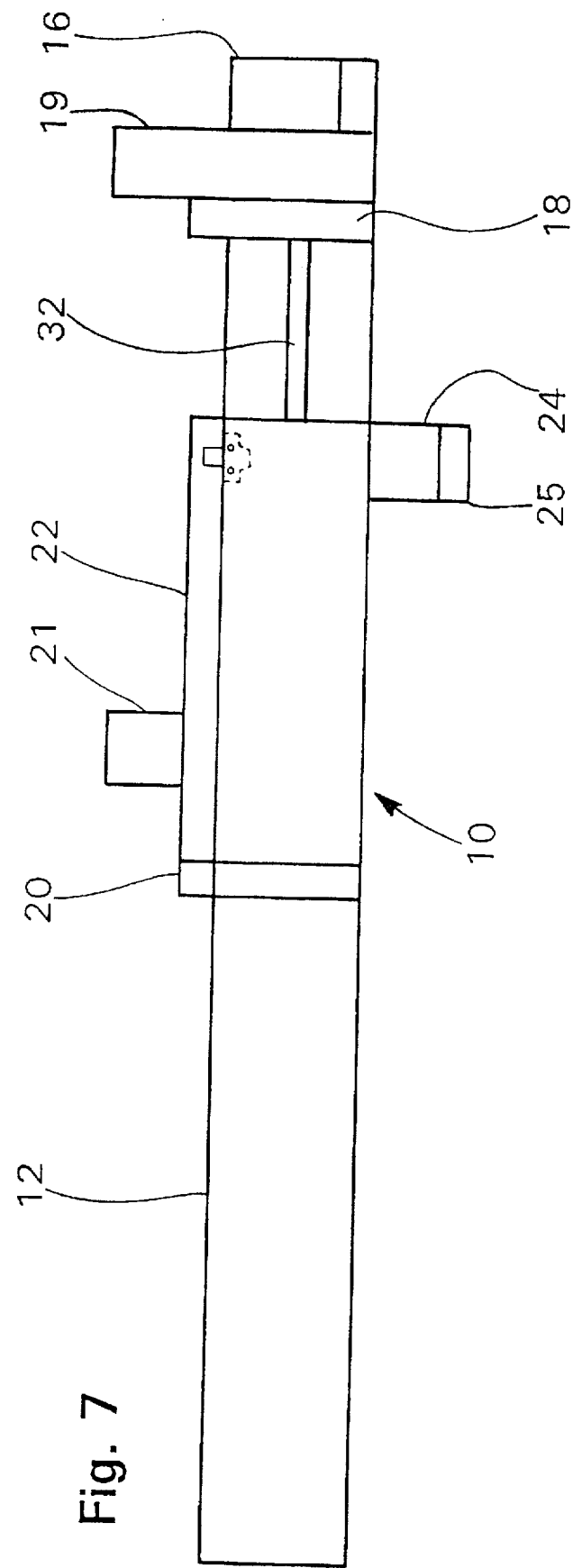
FIG. 7 is a rear elevation of the preferred embodiment in a locked position.

As shown in FIGS. 7 and 8, a guide pin 30 guides movement of the latch 22 through a hollow guiding box 26. A longitudinal groove 32 is displaced along the length of box 26. The pin 30 travels back and forth within the groove 32 to guide movement of the latch 22. The guide box 26 abuts one side of the spacer 18, further reinforcing the first engagement area. The guide box 26 is positioned so as to also rest inside a top open cut-out portion of the steering wheel 27 which further prevents sliding movement of the device 10. A single pin may be employed, but multiple pins are preferred to allow for uniform tracking of the latch 22.

As shown in FIGS. 9 and 10, the lock means 28 is fixedly mounted to the front surface of the bar 12. The lock means 28 is located along the bar so that it is hidden behind the overhanging handle 24 when the device 10 is locked. The space between the front surface of the bar 12 and the handle 24 is determined by the overhang of handle 24 from the bar 12. The space is sufficient to allow a typical person to fit their hand in between the handle 24 and the bar 12 for operation of the lock 28. The handle 24 further has an aperture 36 disposed on an underside surface. As shown in FIG. 9, a key, not shown, is inserted into a key receiving slot 34 to engage a lockpin 31. The lockpin 31 is extendable and retractable from the aperture 36 by the key for locking and unlocking the device 10. To properly lock the device 10, the latch 22 must be slid along the bar 12 until the latch 22 abuts with the second spacer 20.

To further increase security and prevent tampering with the lock, a handle flange 25 provides an additional obstruction for direct access to the key receiving slot 34 of the lock 28, making it difficult to insert a picking implement directly into the keyhole, thus deterring picking or prying of the lock 28.

While the preferred form of the locking device for locking the device 10 preferably comprises a locking member insertable into an aperture, other locking mechanisms may be employed as will be apparent in the art.

The components of the anti-theft device of the invention are all preferably constructed of a metal which may be treated with a corrosion inhibitor or alternatively comprised of a corrosion resistant metal. Furthermore, the interior surface of the hook 16 and the first spacer 18 may be covered with a resilient padding or sleeve, not shown, so as not to damage the steering wheel rim. The device as described is simple in construction, but is highly effective as a theft-proof or tamper-resistant locking device for preventing unauthorized use of a vehicle, or theft of the vehicle's air bag.

With this invention thus explained, it is apparent that numerous modifications and variations can be made without departing from the scope and spirit of this invention. It is therefore intended that this invention be limited only as indicated in the appended claims.

I claim:

1. A tamper resistant anti-theft device for attachment to an automobile steering wheel having a center mounted air bag and an exterior diameter of a selected size, the anti-theft device comprising:

an elongated bar having first and second ends and adapted to have a length greater than the exterior diameter of the steering wheel to which the anti-theft device is to be attached;

engaging means fixed at the first end of said bar for engaging a first portion of the steering wheel, said engaging means including a hook and a first spacer;

a second spacer fixed at a position between the ends of said bar fox engaging a second opposed portion of the steering wheel;

a closing latch mounted on said bar by a pin means for movement from an opened position to a closed position, said closing latch and said second spacer defining an enclosure for confinement of the second portion of the steering wheel when said closing latch is in said closed position;

a reinforcing block fixedly attached between said hook and first spacer, said block extending generally perpendicularly in an upward direction from said bar, thereby preventing the cutting of an immediately adjacent portion of said steering wheel;

a lock covering handle attached to and extending away from said closing latch and projecting a distance away from a front surface of said bar, said handle sized so as to cover a portion of the center area of the steering wheel, said handle further having an aperture disposed on an underside surface therein; and a locking means fixedly attached along said bar, said locking means positioned between said front surface of said bar and an inside surface of said handle when said closing latch is in said closed position.

2. The device according to claim 1 wherein said pin means comprises:

a slide pin mounted on an inside surface of said closing latch; and a hollow guide box mounted on a rear surface of said bar, said guide box having a longitudinal groove extending along the length thereof for interaction with said slide pin to guide the longitudinal movement of said closing latch along said bar.

3. The device according to claim 1 wherein said locking means includes:

a key receiving opening.

4. The device according to claim 3 wherein said locking means further comprises:

a locking pin extendable into said aperture by said key so as to secure said closing latch against movement relative to said first engaging means.

5. The device according to claim 3 wherein said key receiving opening faces in a substantially downward direction from said bar.

6. The device according to claim 1 further comprising:

an L-shaped reinforcing crossbar fixedly attached to said closing latch between said handle and said second spacer and extending perpendicularly towards and terminating flush with said front surface of said bar, thereby preventing the cutting of an immediately adjacent portion of said steering wheel.

7. A tamper resistant anti-theft device for attachment to an automobile steering wheel having a center mounted air bag and an exterior diameter of a selected size, the anti-theft device comprising:

an elongated bar having first and second ends and adapted to have a length greater than the exterior diameter of the steering wheel to which the anti-theft device is to be attached;

an L-shaped hook projecting from the first end of said bar for engaging an outside portion of a first portion of the steering wheel;

a rectangular first spacer projecting from said bar for engaging an inside portion of said first portion of the steering wheel in conjunction with said hook;

a rectangular second spacer projecting from said bar for engaging a second portion of the steering wheel which is diametrically opposed to the first portion of the steering wheel;

a closing latch mounted on said bar by a pin means for movement from an opened position to a closed position, said closing latch and said second spacer defining an enclosure for confinement of the second portion of the steering wheel when said closing latch is in said closed position;

a reinforcing lock fixedly attached between said hook and said first spacer, said block extending generally perpendicularly in an upward direction from said bar, thereby preventing the cutting of an immediately adjacent portion of said steering wheel;

a lock covering handle attached to and extending away from said closing latch and projecting a distance away from a front surface of said bar, said handle sized so as to cover a portion of the center area of the steering wheel, said handle further having an aperture disposed on an underside surface therein; and a locking means fixedly attached along said bar, said locking means positioned between said front surface of said bar and an inside surface of said handle when said closing latch is in said closed position, said locking means including a locking pin extendable into said aperture so as to secure said closing latch against movement relative to said first engaging means.

8. The device according to claim 7 further comprising:

an L-shaped reinforcing crossbar fixedly attached to said latch between said handle and said second spacer and extending across and terminating flush with said front surface of said bar, thereby preventing the cutting of an immediately adjacent portion of said steering wheel.

9. The device according to claim 7 wherein said pin means comprises:

a slide pin mounted on an inside surface of said closing latch; and a hollow guide box mounted on a rear surface of said bar and positioned to fit within an upper open portion of said steering wheel, said box having a longitudinal groove extending along the length thereof for interaction with said slide pin to guide the longitudinal movement of said closing latch along said bar.

10. The device according to claim 7 wherein said L-shaped handle further comprises:

a laterally extending flange portion protruding from an end of said handle for limiting access to said locking means.

11. The device according to claim 7 wherein said locking means further comprises:

a key receiving opening.

12. A tamper resistant anti-theft device for attachment to an automobile steering wheel having a center mounted air bag and an exterior diameter of a selected size, the anti-theft device comprising:

an elongated bar having first and second ends and adapted to have a length greater than the exterior diameter of the steering wheel to which the anti-theft device is to be attached;

an L-shaped hook projecting from the first end of said bar for engaging an outside portion of a first portion of the steering wheel;

a rectangular first spacer projecting from said bar for engaging an inside portion of said first portion of the steering wheel in conjunction with said hook;

a rectangular second spacer projecting from said bar for engaging a second portion of the steering wheel which is diametrically opposed to the first portion of the steering wheel;

a closing latch mounted on said bar by a pin means for movement from an opened position to a closed position, said closing latch and said second spacer defining an enclosure for confinement of the second portion of the steering wheel when said closing latch is in said closed position;

an L-shaped reinforcing crossbar fixedly attached to said latch between said handle and said second spacer and extending across and terminating flush with said front surface of said bar, thereby preventing the cutting of an immediately adjacent portion of said steering wheel;

a lock covering handle attached to and extending away from said closing latch and projecting a distance away from a front surface of said bar, said handle sized so as to cover a portion of the center area of the steering wheel, said handle further having an aperture disposed on an underside surface therein; and a locking means fixedly attached along said bar, said locking means positioned between said front surface of said bar and an inside surface of said handle when said closing latch is in said closed position, said locking means including a locking pin extendable into said aperture so as to secure said closing latch against movement relative to said first engaging means.

13. The device according to claim 12 wherein said pin means comprises:

a slide pin mounted on an inside surface of said closing latch; and a hollow guide box mounted on a rear surface of said bar and positioned to fit within an upper open portion of said steering wheel, said box having a longitudinal groove extending along the length thereof for interaction with said slide pin to guide the longitudinal movement of said closing latch along said bar.

14. The device according to claim 12 wherein said L-shaped handle further comprises:

a laterally extending flange portion protruding from an end of said handle for limiting access to said locking means.

\* \* \* \* \*

UNITED STATES PATENT AND TRADEMARK OFFICE
CERTIFICATE OF CORRECTION

PATENT NO. : 5,673,577
DATED : October 7, 1997
INVENTOR(S) : Robert A. Hileman, Jr.

It is certified that error appears in the above-identified patent and that said Letters Patent is hereby corrected as shown below:

In claim 1, at column 4, line 11, delete "fox" and insert --for-- therefor.

In claim 7, at column 5, line 17, delete "lock" and insert --block-- therefor.

Signed and Sealed this

Twenty-third Day of December, 1997

Attest:

BRUCE LEHMAN

*Attesting Officer*  *Commissioner of Patents and Trademarks*